United States Patent [19]

Ahl

[11] Patent Number: 5,224,561

[45] Date of Patent: Jul. 6, 1993

[54] WEIGH-RAIL

[75] Inventor: Nils G. Ahl, Västerås, Sweden

[73] Assignee: Flintab AB, Västerås, Sweden

[21] Appl. No.: 864,613

[22] Filed: Apr. 7, 1992

[51] Int. Cl.⁵ .......................................... G01G 21/22
[52] U.S. Cl. ................................... 177/163; 177/255; 177/DIG. 9
[58] Field of Search ............... 177/163, 255, DIG. 9

[56] References Cited

U.S. PATENT DOCUMENTS

| | | | |
|---|---|---|---|
| 3,347,326 | 10/1967 | Raskin | 177/163 |
| 3,421,593 | 1/1969 | Buchman | 177/163 |
| 3,714,997 | 2/1973 | Ahl et al. | 177/136 |
| 3,734,216 | 5/1973 | Nordstrom et al. | 177/136 |
| 3,734,217 | 5/1973 | Flinth et al. | 177/163 |
| 3,741,327 | 6/1973 | Nordstrom et al. | 177/163 |
| 3,746,111 | 7/1973 | Berthiaume et al. | 177/163 |
| 3,747,715 | 7/1973 | Nordstrom et al. | 177/134 |
| 4,170,268 | 10/1979 | Nordstrom et al. | 177/163 |
| 4,549,622 | 10/1985 | Leiman | 177/134 |
| 4,627,507 | 12/1986 | Powell et al. | 177/211 |
| 4,800,972 | 1/1989 | Snead | 177/163 |

Primary Examiner—Benjamin R. Fuller
Assistant Examiner—Randy W. Gibson

[57] ABSTRACT

Weighing of railway cars is accomplished by replacing a short section of fixed rail with a weigh-rail, and supporting the weigh-rail as well as sections of the fixed rail near the weigh-rail on an added foundation structure. The weigh-rail has a weigh-rail body for supporting the wheels of the railway car, and two dual shear beam load cells arranged transverse to the weigh-rail body. The weigh-rail is supported on the foundation structure solely by the four ends of the two dual shear beam load cells, and bumpers are arranged adjacent the ends of the load cells for maintaining the weigh-rail body aligned with the fixed rail ends. Bumpers are also arranged to prevent one end of the weigh-rail from flipping upwards when a railway car wheel enters the other end of the weigh-rail.

15 Claims, 5 Drawing Sheets

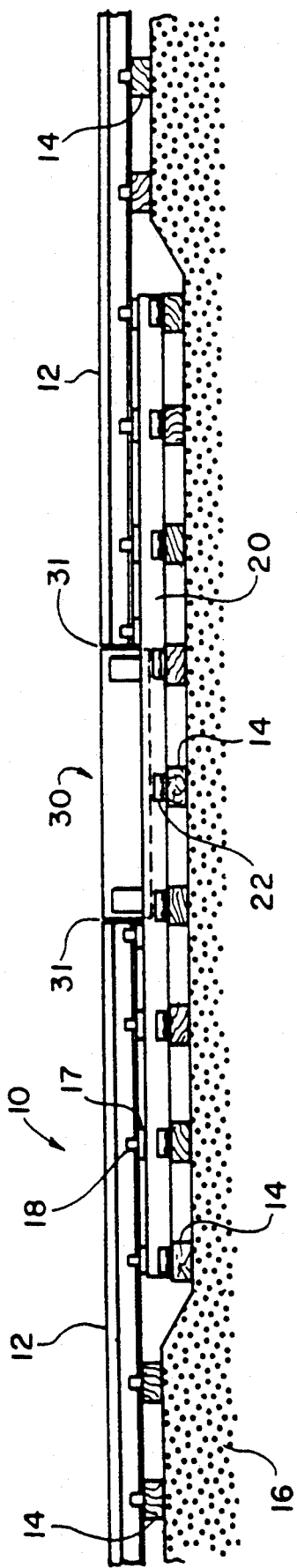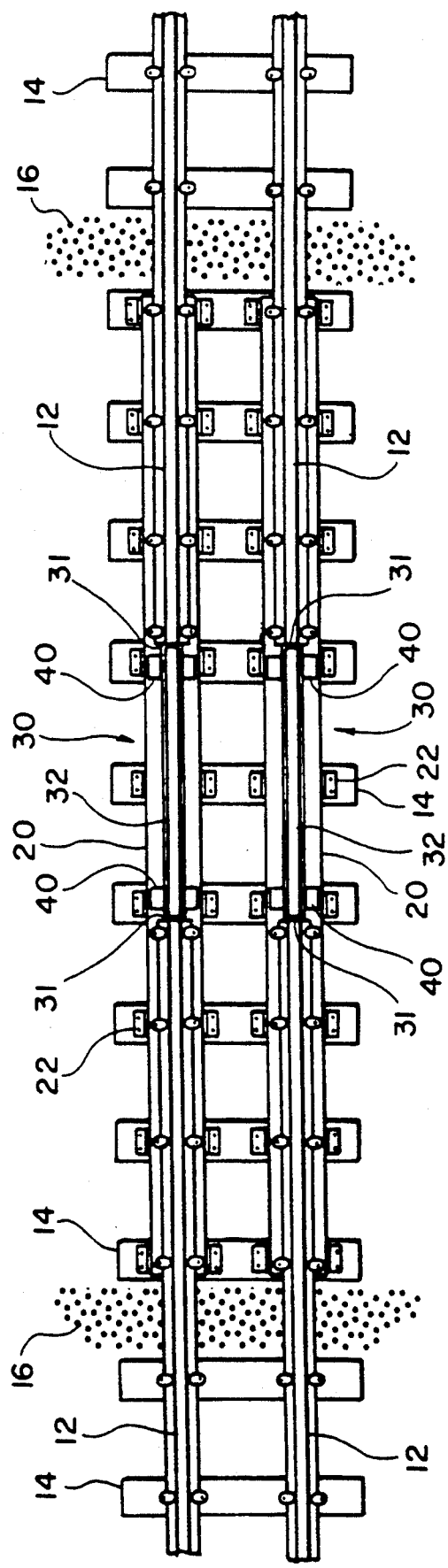

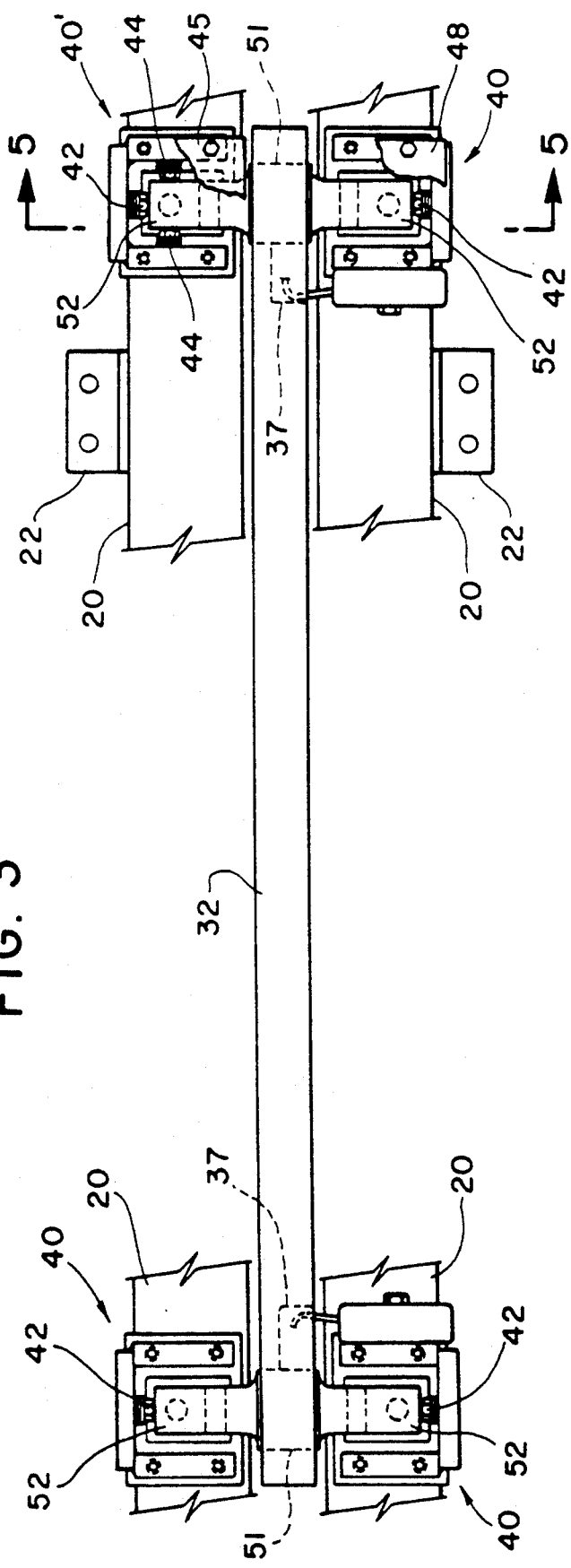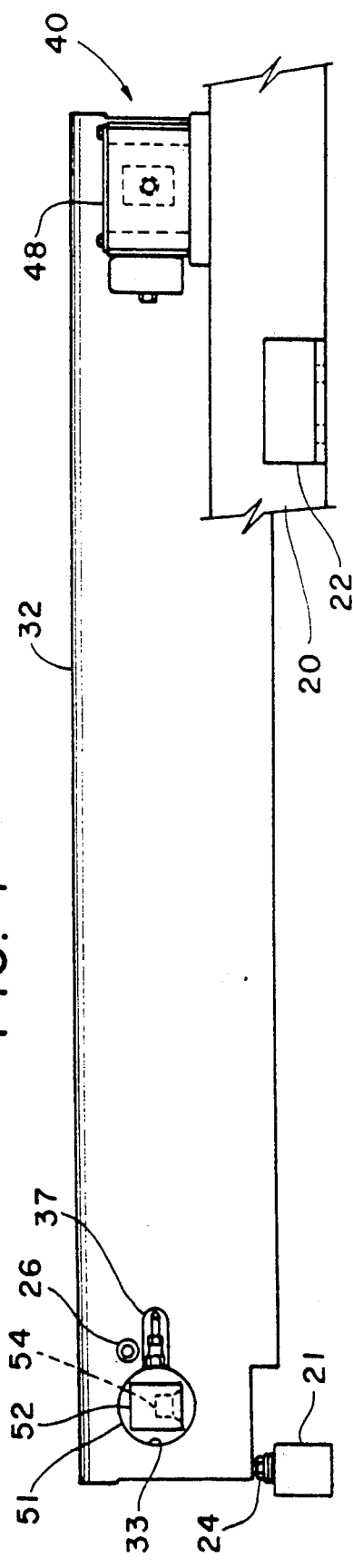

WEIGH-RAIL

BACKGROUND OF THE INVENTION

The present invention relates to apparatus for weighing of rail supported vehicles, such as railway cars, while the vehicle is moving on the rail system, and specifically a weigh-rail for use in such an apparatus.

The need for in-motion weighing of railway cars is well established, and many designs of apparatus for this purpose are in use.

U.S. Pat. No. 3,714,997 describes a weighing device comprising a weighing platform supported by a pair of rails and adapted to engage the flanges of the wheels on a railway car so the wheels are lifted off the rail for weighing. The weighing platform is flexible so it can move with the rails.

U.S. Pat. No. 3,734,216 describes a weigh-rail, which replaces a short piece of the regular rail. The load on the weigh-rail is measured by shear sensing strain gages arranged on the sides of the weigh-rail near the neutral axis for bending. The ends of the weigh-rail is connected to the corresponding ends of the regular rails via flexures.

U.S. Pat. No. 3,734,217 describes a weighing device comprising a weighing platform with rail supporting means replacing a short section of the regular rails. The weighing platform is supported by the regular rails or sleepers. The weighing platform is designed to move with the rails by a floppy H design.

U.S. Pat. No. 3,741,327 describes another weighing device with a weigh-rail replacing a short section of the regular rails. The weigh-rail is supported on a structural beam foundation, which also supports the free ends of the regular rails adjacent the cut-out for the weigh-rail. The load on the weigh-rail is measured by shear sensing strain gages arranged near the neutral axis for bending in pockets on the sides of the weigh-rail.

U.S. Pat. No. 3,747,715 describes still another weighing device with a weigh-rail replacing a short section of the regular rails. The weigh-rail in this case is supported on a rigid foundation via a pair of load cells, and its ends are connected to the regular rails via friction free elastic joints arranged between the load cell supported part of the weigh-rail and the elastic joints.

U.S. Pat. No. 4,170,268 describes a weighing device for railway cars, in which a section of the regular rails is supported by special weighing sleepers with strain gages.

SUMMARY OF THE INVENTION

An object of the present invention is to provide a weighing apparatus for inmotion weighting of rail supported vehicles that is simple and inexpensive to build, but still can weigh railway cars with high accuracy.

Another object of the invention is to provide a weigh-rail that is simple to manufacture and easy to calibrate.

A still further object of the invention is to provide a weigh-rail with selectable dimensions and capacity that can be assembled from standard components.

Additional objects and advantages of the invention will be set forth in part in the description which follows, and, in part, will be obvious from the description, or may be learned by practice of the invention.

The objects of the invention are achieved by a weigh-rail including a piece of rail having first and second ends, a pair of dual shear beam load cells, each load cell having a load carrying center section and two distal support surfaces and strain gage means arranged between the center section and each of the distal support surfaces, and mounting means for mounting the piece of rail rigidly on the pair of dual shear beam load cells with the load cells arranged transversely to the piece of rail near the first and second ends, so the piece of rail is supported solely by the load carrying center sections of the load cells.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is an elevational view of a railway track including a weigh-rail according to a preferred embodiment of the invention.

FIG. 2 is a plan view of the railway track shown in FIG. 1.

FIG. 3 is a top view of a weigh-rail according to a preferred embodiment of the invention mounted in bumper boxes with the lids removed.

FIG. 4 is a side view of the weigh-rail shown in FIG. 4 with the bumper boxes removed on the left side.

DETAILED DESCRIPTION OF A PREFERRED EMBODIMENT

Figure 5:
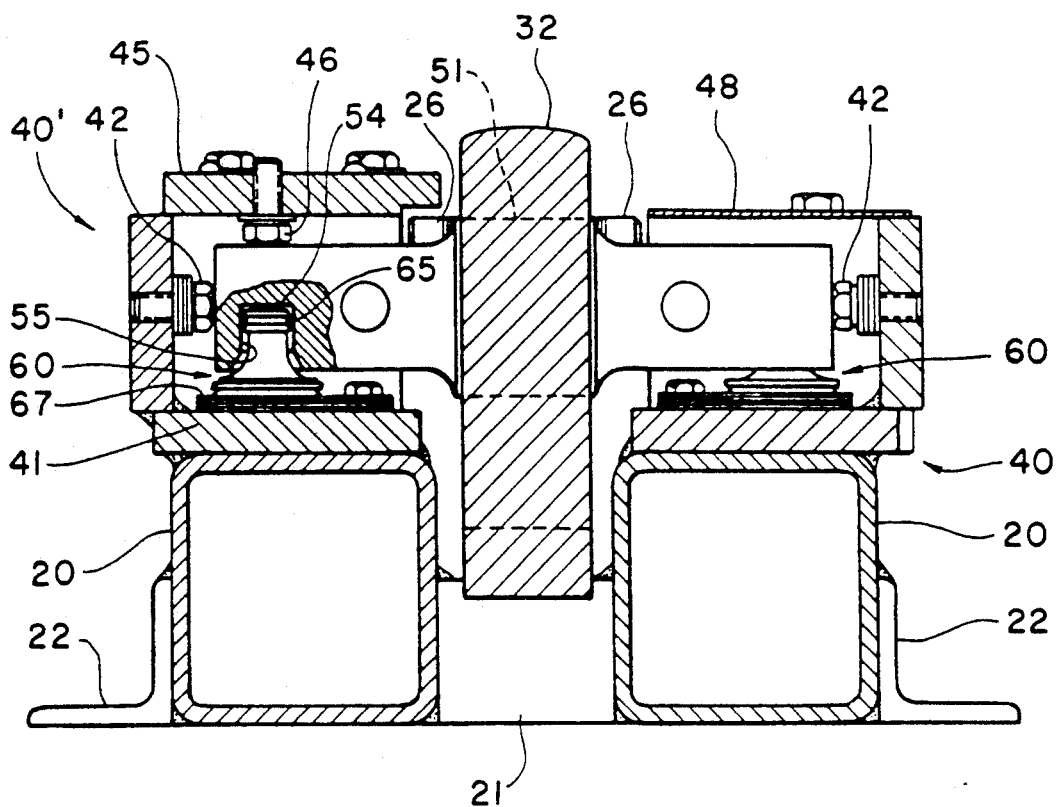
FIG. 5 is an end view, partly in section, of a weigh-rail according to the preferred embodiment of the invention mounted in bumper boxes on a foundation structure in the railway track.

An overall view of a railway track 10 with a pair of weigh-rails 30 for inmotion weighing of railway cars is shown in FIGS. 1-2. A pair of fixed rails 12 are supported by sleepers 14 on a ballast bed 16 of gravel, as is standard in the art. A short section of the fixed rails 12 is removed, and a pair of weigh-rails 30 according to the preferred embodiment of the invention are installed in the gaps caused by removal of the fixed rail section.

A rigid foundation structure 20, for instance a pair of box beams as shown in FIG. 5, is arranged under each of the two weigh-rails 30 and adjacent sections of the fixed rails 12. The rigid foundation structures 20 are supported on regular sleepers 14 resting on a regular ballast bed 16 of gravel. The gravel bed 16 below the support structures 20 is arranged lower than the regular gravel bed 16 to accommodate the height of the foundation structures 20.

The support structures are tied to the sleepers by means of L-brackets 22. The parts of the fixed rails 12 that rest on the rigid foundation structures 20 are kept in place by soleplates 17 welded to the foundation structure 20 and bolted clamps 18 over the sole of the rail profile 12, similar to the mounting of the fixed rails on regular sleepers.

In order to assure that a small gap 31 is always maintained between the ends of the regular rails 12 and the ends of the weigh-rails 30, all four rail 12 ends adjacent to the weigh-rails 30 are locked axially to the foundation structures by pins or bolts through the rail 12 sole and the foundation structure 20, or by welding.

The design of a weigh-rail 30 according to the preferred embodiment of the invention is illustrated in FIGS. 3-5. Each weigh-rail 30 comprises a weigh-rail body 32, which is a short piece of rail substitute such as a piece of steel bar with essentially rectangular cross section having a slightly rounded top surface, and a pair of dual shear beam load cells 50, which are mounted near the ends of the weigh-rail body 32 crosswise to the weigh-rail body 32. A dual shear beam load cell 50 is a combination of two regular shear beam load cells with a common mounting section and two separated load application areas.

Figure 6:
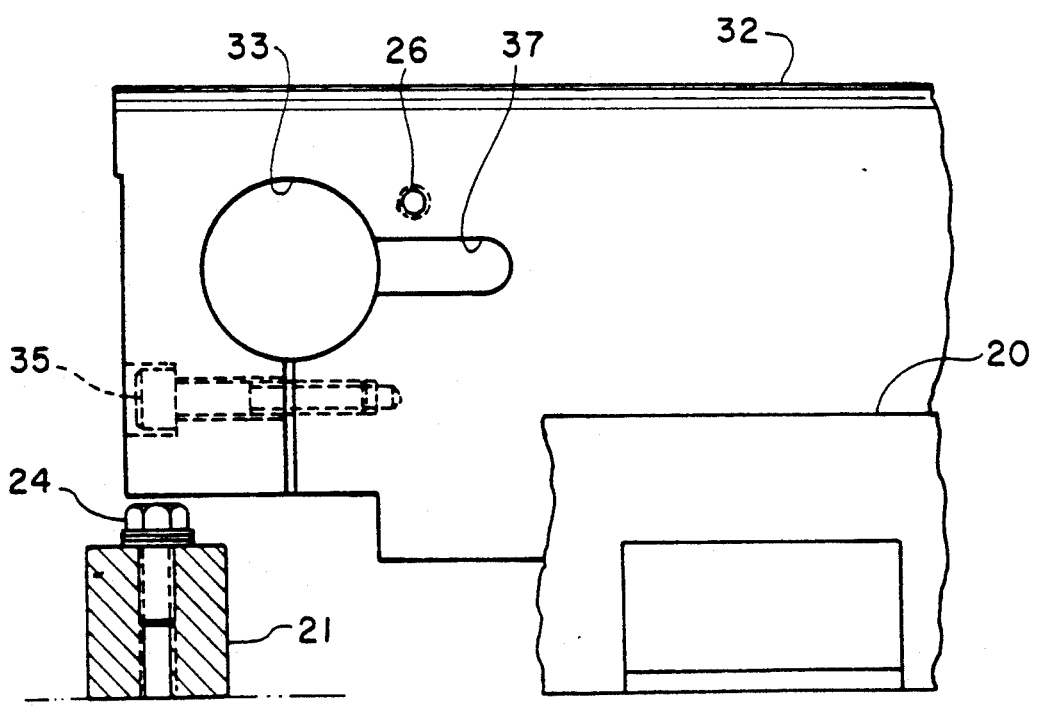
FIG. 6 is a partial side view of a weigh-rail as shown in FIG. 4, but with a different design of the mounting means for mounting the load cell in the weigh-rail body.
Figure 7:
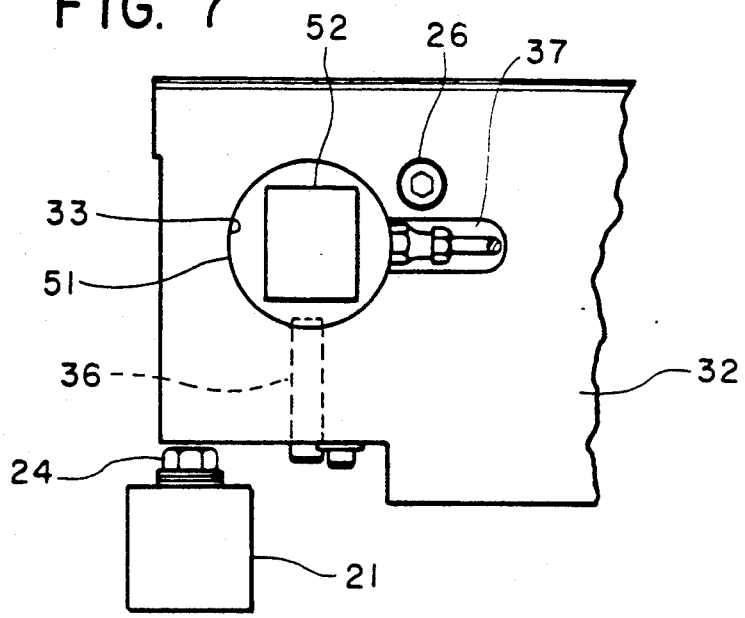
FIG. 7 is a partial side view of a weigh-rail as shown in FIG. 4, but with another design of the mounting means for mounting the load cell in the weigh-rail body.

A preferred form of load cell 50 is shown in FIGS. 3-5 and 8-10. It has a cylindrical mounting section 51, which is mounted rigidly in a corresponding cylindrical hole 33 machined in the weigh-rail body 32. Rigid mounting can be assured by shrink-fitting the hole 33 in a heated weigh-rail body on the load cell center 51, as implied in FIGS. 3-5, or by clamping a tight fitting hole 33 on the load cell mounting area 51 by a bolt 35 as illustrated in FIG. 6, or by fitting a pin 36 in a hole drilled through the bottom of the weigh-rail body 32 into a corresponding hole in the bottom of the load cell center 51, as illustrated in FIG. 7. Other mounting methods will occur to those skilled in the art.

Figure 8:
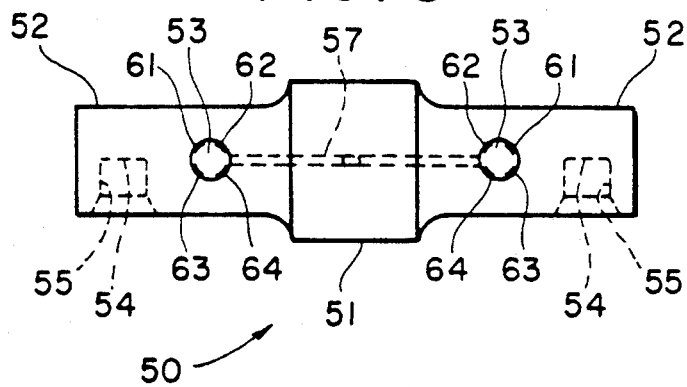
FIG. 8 is an elevational view of a dual shear beam load cell suitable for use in a weigh-rail according to the invention.
Figure 9:
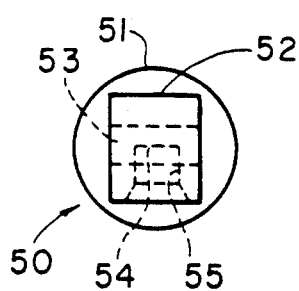
FIG. 9 is an end view of the dual shear beam load cell shown in FIG. 8.
Figure 10:
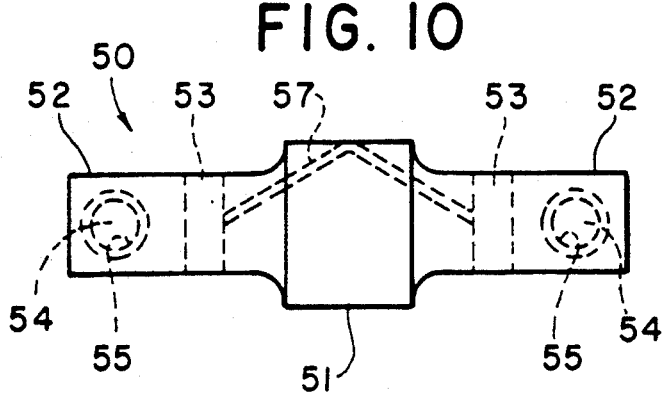
FIG. 10 is a top view of the dual shear beam load cell shown in FIG. 8.

Details of a preferred dual shear beam load cell 50 design, which is especially suitable for a weigh-rail 30 according to the invention, are shown in FIGS. 8-10. The load cell 50 is an elongate structure, which is symmetrical about a midsection 51. Each half of the load cell 50 comprises a bending beam 52 with square cross section, which gradually merges into a cylindrical mounting section 51 common to the two halves of the load cell 50. A preferred method for manufacturing the load cell is by milling a cylindrical bar of stainless steel, or other load cell material, to form the square cross sections 52 on both sides of the cylindrical mounting section 51.

Each bending beam 52 has a free end away from the center section 51, and a downward facing load application surface 54 near the free end. The load application surface 54 is preferably the top surface of a blind hole 55 recessed into the beam 52 from below. By having the load application surface 54 recessed in the beam 52, any side forces acting on the loading surface 54 will act close to the neutral axis of the beam 52, so residual sensitivity to torque and bending moment in the load cell 50 will be reduced. This is especially important when the bending beam 52 is short.

A horizontal through hole 53 is arranged crosswise to the bending beam 52 about halfway between the central section 51 and the load application surface 54. A set of four strain gages 61, 62, 63, 64 are bonded to the inside surface of the through hole 53 as indicated in FIG. 8, and are connected into a Wheatstone bridge circuit (not shown). The through holes 53 are hermetically sealed after the strain gages 61, 62, 63, 64 and associated components (not shown) for temperature compensation, zero adjustment, and calibration have been mounted. Channels 57 for wires are provided in the load cell 50 as shown in FIGS. 8 and 10, and corresponding openings 37 for wiring are milled into the sides of the weigh-rail body 32 as shown in FIGS. 3, 4, 6, and 7.

Each of the four strain gages 61, 62, 63, 64 in the through hole 53 in the beam 52 of a load cell 50 according to FIGS. 8-10 senses mainly bending strain in the beam 52, but the Wheatstone bridge cancels the bending moment components of the individual strain gage signals, so the net output signal from the Wheatstone bridge is substantially independent of the position of the load acting on the bending beam 52. The strain gage bridge thus effectively, but indirectly, measures the shear force on the load cell 50 beam 52 between the through hole 53 and the load application surface 54, as is well known in the art. See, for example, U.S. Pat. No. 3,180,139 to Soderholm and U.S. Pat. No. 3,949,603 to Laimins.

The shear force on the load cell beam 52 could have been measured directly by strain gages arranged at 45° angles on the walls of a web in the middle of the hole 53 in the load cell beam 52, as is well known in the art. Such a web can be formed by machining a pair of opposing blind holes with flat bottoms into the beam 52, replacing the through hole 53 of FIGS. 8-10. The choice between the two methods for measuring shear force on the load cell beam 52 is a matter of cost and convenience, and the way shear force is actually sensed is not important to the invention.

Figure 11:
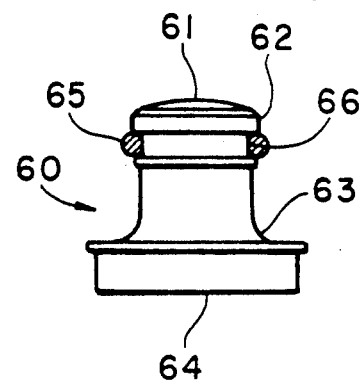
FIG. 11 is an elevational view of a loading button used with the load cell shown in FIGS. 8-10.

The force acting on each beam 52 is transmitted from the load application surface 54 to the foundation 20 by means of a loading button 60. The loading button 60 is preferably shaped as shown in FIG. 11, with a convex top surface 69 adapted to press against the load application surface 54, and a cylindrical section 70 sized to fit with a small clearance in blind hole 55 in the load cell 50. The lower part of the loading button 60 is a frustum 71, which provides a relatively large flat bottom surface 68. The bottom surface 68 will be supported on a sliding plate 67 in a bumper box 40 mounted on the scale foundation 20, as shown in FIG. 5 and as will be described below. The bottom surface 68 of the loading button 60 will slide laterally on the sliding plate 67 to accommodate thermal expansions, etc., so it is usually provided with a thin shim of porous bronze impregnated with teflon and other lubricants for reduced friction against the sliding plate 67.

An O-ring 65 is arranged in an annular grove 66 in the loading pin 60 in order to seal the blind hole 55 so dirt can not enter the load application surface 54. The O-ring also centers the loading pin 60 elastically in the blind hole 55. A rubber seal is also usually fitted around the lower part 71 of the loading button 60 in order to keep the sliding plate 67 free from dirt below the bottom surface 68 of the loading button 60.

The convex top surface 69 allows the loading button 60 to rock slightly against the loading surface 54 in the load cell 50, so small misalignments between the load cell 50 and the sliding surface 67 can be tolerated.

The weigh-rail body 32 must be carefully aligned with the rail 12 ends adjacent the cut-out for the weigh-rail 30, so a railway car wheel can ride from the regular rail 12 to the weigh-rail 30 and back on the regular rail 12 without bumping and twisting. But accurate weighing of a rail car requires that the weigh-rail body 32 must be supported only by the load cells 50, and must not touch the regular rail ends 12 or anything else connected to the foundation structure 20. According to the preferred embodiment of the invention, the mounting requirements for the weigh-rail can be satisfied by supporting the load cells 50 on loading buttons 60, and aligning the weigh-rail 30 on the foundation structure 20 solely via the four ends of the load cells 50.

The alignment of the weigh-rail 30 is provided for by four bumper boxes 40, which are welded to the foundation structure 20 as shown in FIGS. 1–5. The bottom 41 of each bumper box 40 is aligned to be substantially horizontal, and it is usually covered by a stainless steel sheet 67, on which the bottom surface 68 of the loading button 60 can slide laterally in all directions.

First, the top of the weigh-rail 30 is adjusted to be flush with the adjacent rail 12 ends when it is resting on its loading buttons 60 by adjusting the height of the sliding surfaces 67 in the four bumper boxes 40, for instance by shimming, as indicated in FIG. 5.

Next, both ends of the weigh-rail 30 are aligned laterally with the adjacent rail 12 ends by adjustable end bumpers 42 acting against the vertical end surfaces of the free ends of all four bending beams 52. The four end bumpers 42 are mounted in rigid end walls in the four bumper boxes 40 as shown in FIG. 3. The end bumpers 42 are adjusted till the weigh-rail 30 is properly aligned laterally, and then backed off to leave a small gap in the order of 0.5 mm wide against each load cell 50 end. The gaps prevent binding in the weighing system, but they are so small that they have no detrimental effect on railway car travel on and off the weigh-rail 30.

Next, the weigh-rail 50 is aligned lengthwise between the ends of the fixed rails 12 so a small gap 31 is maintained at each end. This is done by adjustable side bumpers 44 arranged in the rigid side walls of one of the bumper boxes 40, for instance in the box marked 40' in FIGS. 3 and 5. These two side bumpers 44 are adjusted till the ends of the weigh-rail body 32 are centered between the ends of the fixed rails 12 adjacent to the weigh-rail 30, and then backed off to leave a small gap against the sides of the load cell beam 52 to avoid binding. The ends of the regular rails 12 are already fixed lengthwise to the foundation structure, as explained above. Note that side bumpers 44 are required in only one of the bumper boxes 40', because the weigh-rail 30 is already prevented from shifting sideways or rotating in the lateral plane by the four end bumpers 42, so it could only move lengthwise before the side bumpers 44 were adjusted. Side bumpers 44 in more than one bumper box 40' would only increase the risk of binding because of thermal expansions and contractions. The side bumpers 44 are preferably arranged to act on the load cell beam 52 at points approximately aligned with the loading surface 54 of the bending beam 52.

Finally, the weigh-rails 30 are prevented from flipping up at one end when a railway car wheel enters the other end by top bumpers 46 mounted in removable lids 45 on the bumper boxes 40 as shown in FIG. 5. A wheel entering the weigh-rail 30 will first put a load on the weigh-rail 30 body 32 outside a first load cell 50, so the entry end of the weigh-rail 30 would drop and the railway car wheel would suffer a serious bump if the weigh-rail 30 were allowed to flip. With the top bumper 46 in place, the entry end of the weigh-rail 30 suffers only an insignificant drop. It is sufficient to provide top bumpers 46 on one side of each load cell 50, because the weigh-rail 30 is prevented from twisting by being supported on both sides by the two load buttons 60 in the load cell 50 at the end where the wheel that causes the flipping up enters the weigh-rail 30.

All four bumper boxes 40 have removable lids 45, 48 mounted to the side and end walls of the bumper boxes 40 by means of screws or bolts as seen in FIGS. 4 and 5. Two of these lids 45, for instance on the left side of the weigh-rail 30 as shown in FIGS. 3 and 5, are rigid and carry adjustable top bumpers 46. The top bumpers 46 are preferably arranged to be aligned with the center of the blind hole 55 in the corresponding bending beam 52, and are adjusted to maintain a small gap against the top of the bending beam 52. The two other lids 48 on bumper boxes 40 are only used for closing the top of a bumper box 40, and can be made from thin material.

The weight indicated by a scale instrument (not shown) connected to the strain gage bridges in the four load cell beams 52 is always an accurate measure of the vertical force exerted by a railway car wheel or wheels riding on the weigh-rails 30, except in the instant when a wheel is exactly over a gap 31 between the fixed rail 12 and the weigh-rail 30 so it is supported only partly by the weigh-rail. The proportion of the total load sensed by each of the two load cells 50 at either end of the weigh-rail 30 depends on where the wheel is located on the weigh-rail 30, as is well known in the art. When a wheel has just entered the weigh-rail 30, before it passes over the first load cell 50, the second load cell 50 will sense a negative load from the top bumpers 46 acting on the top of the load cell beam 52, but the first load cell 50 will sense a load larger than the actual wheel load, so the sum of the outputs from the two load cells 50 will equal the actual wheel load even in this case.

It should be noted that the end bumpers 42 and the side bumpers 44 will not cause any weighing errors, even if they were causing vertical friction forces on the load cell beams 52. Such friction forces act on the support ends of the load cell beams 52, in parallel with the force via the loading buttons 60, so they do not affect the shear strains in the load cell beams 52 caused by the load acting on the centers 51 of the load cells 50.

Safety stops 24 and 26 may be added to the weigh-rail installation to maintain integrity of the rail surface if the load cells 50 supporting the weigh-rail body 32 should collapse mechanically. A vertical safety stop 24 mounted on a cross piece 21 welded to the foundation structure 20 near each end of the weigh-rail body 32 as indicated in FIGS. 4–7 will prevent the weigh-rail 32 from dropping more than a predetermined distance. Similar side stops 26 mounted on the weigh-rail body 32 can also be arranged as shown in FIGS. 4–7 to limit twisting and lateral movement of the weigh-rail body 32 relative to the foundation structure 20. Safety stops 26 can for instance be arranged to act against side walls of the bumper boxes 40. Note that the gaps at the safety stops 24, 26 must be wider than the gaps at the alignment stops 42, 44, 46 for the weigh-rail 30 in order to avoid weighing errors during normal operation of the weigh-rail 30.

A weigh-rail 30 according to the invention as described above provides several important advantages over the prior art.

First, the scale hardware is very simple and easy to install.

Figure 12:
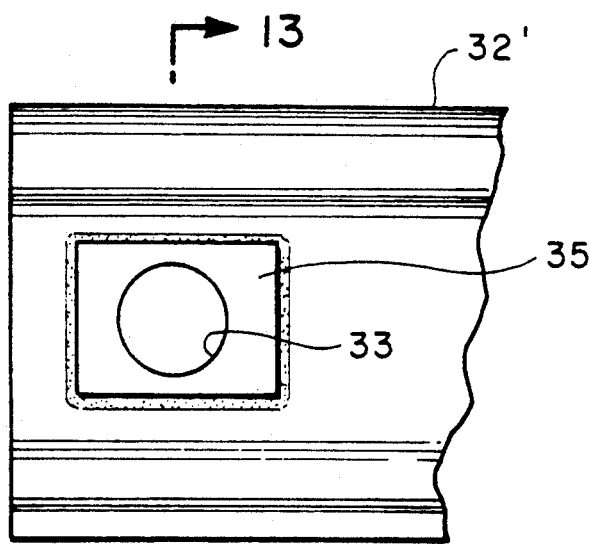
FIG. 12 is a partial elevational view of an alternate design of a weigh-rail according to the invention.
Figure 13:
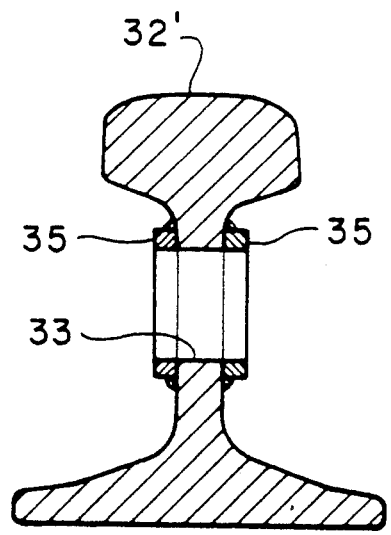
FIG. 13 is a sectional view of the alternate weigh-rail design shown in FIG. 12 taken along line 13—13.

Second, the length and the cross section of the weigh-rail body 32 can easily be modified to meet different requirements, while the load cells 50 and the bumper boxes 40 remain stock items. The weigh-rail body 32 can even be a standard rail profile 32', as shown in FIGS. 12-13. Reinforcements 35 may be welded on to the rail web 32', as indicated in FIGS. 12-13, if this is required to provide twist free mounting of the load cell centers 51 in the rail web 32'. The load cell centers 51 may be secured in the rail web 32' by crimping, or by means of locking pins similar to the locking pins 36 shown in FIG. 7.

Third, all the load sensing parts of the weigh-rail 30 are contained in load cells 50 that are removably mounted in the weigh-rail body 32. The load cells 50 can thus be manufactured and tested as separate units. This is a great advantage over previously known weigh-rails, where the strain gages were mounted directly on the weigh-rail body. The weigh-rail body 32 in a weigh-rail 30 according to the invention does not have to be made of expensive material with low creep and hysteresis to meet accuracy requirements in the load sensing part, which saves considerable cost, and the heavy and bulky weigh-rail body 32 need not be handled during gaging and testing of the load cells 50.

Fourth, a weigh-rail 30 according to the invention is easy to replace in case of damage, and a damaged weigh-rail 30 can easily be repaired. In most cases, repair involves only replacement of one or both of the load cells 50, or if the weigh-rail 30 is replaced because of wear, the weigh-rail body 32 can be replaced while the load cells 50 are re-used.

For accurate weighing it is usually necessary to weigh both sides of a railway car simultaneously. This requires a pair of parallel weigh-rails 30 arranged as shown in FIG. 2. In some applications, where high weighing accuracy is not required, it may be sufficient to use only one weigh-rail 30 to measure the load on one side of the railway car only, while the other rail 12 remains continuous past the weighing section.

The description above does not include details of many components and accessories used in weighing systems, such as wiring, sealing, cable connections, junction boxes, scale instruments, calibration components and methods, and common mechanical devices. These components are needed in load cells and weighing apparatus, but they were excluded from the description above because their description would not assist in the understanding of the present invention. All of these components and accessories are well known by those skilled in the art, and their exclusion from the description above does not limit the scope of the present invention.

The invention is not limited in scope to the preferred embodiment of a weigh-rail 30 illustrated in the Figures and described above, but is limited only by the appended claims and equivalents thereof.

I claim:

1. Weigh-rail, comprising:
   (a) an elongate weigh-rail body having first and second ends;
   (b) two dual shear beam load cells, each of said dual load cells having a load carrying center section and two bending beam sections with free ends away from the center section and downward facing support surfaces near said free ends, and strain gages arranged on said bending beam sections between said center section and each of said support surfaces; and
   (c) mounting means for rigidly mounting the center sections of said two dual shear beam load cells in said weigh-rail body near said first and second ends with the bending beam sections transverse to said body.

2. Weigh-rail according to claim 1, wherein said support surfaces are top surfaces of blind holes extending upward from a bottom of said bending beam sections.

3. Weigh-rail according to claim 2, further including loading buttons for transferring the load on said weigh-rail from said support surfaces to a foundation.

4. Weigh-rail according to claim 1, further including bumper means for fixing the position of a free ends of said bending beam sections so the weigh-rail body is aligned with a fixed rail abutting said weigh-rail body.

5. Weigh-rail according to claim 4, wherein said bumper means includes bumpers limiting upward movement of said bending beam sections.

6. Weigh-rail according to claim 1, wherein said mounting means includes holes in said weigh-rail body closely fitting on said center sections of said load cells, and means for fixing said load cells rigidly to said weigh-rail body.

7. Weigh-rail according to claim 1, wherein said weigh-rail body is a piece of steel bar with substantially rectangular cross section.

8. Weigh-rail according to claim 1, wherein said weigh-rail body is a piece of regular rail, and said mounting means includes reinforcements on a web of said regular rail.

9. Apparatus for weighing a vehicle having wheels supported by a fixed rail, comprising:
   (a) a weigh-rail having a predetermined length adapted to replace a section of the fixed rail;
   (b) foundation means for supporting said weigh-rail;
   (c) means for maintaining a gap slightly longer than the length of said weigh-rail between ends of said fixed rail abutting said replaced rail section;
   (d) said weigh-rail including
      (i) an elongate weigh-rail body having first and second ends;
      (ii) two dual shear beam load cells, each of said dual load cells having a load carrying center section and two bending beam sections with free ends away from the center section and downward facing support surfaces near said free ends, and strain gages arranged on said bending beam sections between said center section and each of said support surfaces;
      (iii) mounting means for rigidly connecting the center sections of said two dual shear beam load cells in said weigh-rail body near said first and second ends with the bending beam sections transverse to said body;
      (iv) loading buttons interposed between said support surfaces of said load cells and said foundation means for transferring the load on said weigh-rail to said foundation means; and
      (v) bumper means for fixing a position of said free ends so the weigh-rail body is aligned with the fixed rail ends abutting said replaced rail section.

10. Apparatus for weighing a vehicle having wheels supported on fixed rails according to claim 9, wherein a pair of weigh-rails are arranged to support wheels on opposite sides of the vehicle.

11. Apparatus for weighing a vehicle having wheels supported on a fixed rail according to claim 9, wherein said mounting means includes holes in said weigh-rail body closely fitting on said center sections of said load cells, and means for fixing said load cells rigidly to said weigh-rail body.

12. Apparatus for weighing a vehicle having wheels supported on a fixed rail according to claim 9, wherein said weigh-rail body is a piece of regular rail, and said mounting means includes reinforcements in a web of the regular rail.

13. Apparatus for weighing a vehicle having wheels supported on a fixed rail according to claim 9, wherein said weigh-rail body is a piece of steel bar with substantially rectangular cross section.

14. Apparatus for weighing a vehicle having wheels supported on a fixed rail according to claim 9, wherein said foundation means includes safety bumpers for limiting a movement of said weigh-rail body in case of mechanical failure in said load cells.

15. Apparatus for weighing a vehicle having wheels supported on a fixed rail according to claim 9, wherein said bumper means includes bumpers limiting upward movement of said bending beam sections.

* * * * *